United States Patent
Mager et al.

[11] Patent Number: 5,257,093
[45] Date of Patent: Oct. 26, 1993

[54] APPARATUS FOR MEASURING NANOMETRIC DISTANCES EMPLOYING FRUSTRATED TOTAL INTERNAL REFLECTION

[75] Inventors: Michael Mager, San Jose; Boris Slutsky, Palo Alto, both of Calif.

[73] Assignee: Guziktechnical Enterprises, Inc., San Jose, Calif.

[21] Appl. No.: 791,038

[22] Filed: Nov. 12, 1991

[51] Int. Cl.$^5$ ............................................. G01B 11/14
[52] U.S. Cl. ........................................................ 356/375
[58] Field of Search .......................... 356/372, 373, 375

[56] References Cited

U.S. PATENT DOCUMENTS

| | | | |
|---|---|---|---|
| 4,490,618 | 12/1984 | Cielo | 356/429 |
| 4,593,368 | 6/1986 | Fridge et al. | 356/357 |
| 4,681,451 | 7/1987 | Guerra et al. | 356/373 |
| 4,813,782 | 3/1989 | Yagi et al. | 356/357 |
| 4,818,710 | 4/1989 | Sutherland et al. | 356/445 |

FOREIGN PATENT DOCUMENTS 54405 3/1991 Japan ................................ 356/373

*Primary Examiner*—Richard A. Rosenberger
*Attorney, Agent, or Firm*—David Pressman

[57] ABSTRACT

An apparatus employs the phenomenon of frustrated total internal reflection for measuring nanometric distances. It includes a two-piece glass reference disk (200) consisting of an inner disk (202) and a coupling lens (212). The inner disk (202) contains a convex spherical surface (204) and a flat bottom surface (206). The coupling lens has a planar top surface (214) and a concave spherical surface (216). It is fixed over the inner disk which is rotated by a spindle (208). Aligned prisms (218 and 220) have polished planes (222 and 224) and polished surfaces (230 and 232). These surfaces provide optical contact of the prisms with the planar top surface of the coupling lens. A magnetic head (238) is suspended over the flat bottom surface of the inner disk. Other configurations of the reference disk and optical prisms are possible. One of the variations of the optical system contains a colored-light source (248), aimed at the polished prism surface at essentially normal incidence, a beam expander (250), placed between the light source and the polished prism surface, and a TV camera (252), which is positioned opposite the polished prism surface (222). As the spindle rotates the inner disk, the magnetic head floats on an air cushion created by the surface of the glass disk. A light beam (242), generated by the light-source, is converted into a wide parallel beam (244), which is directed at the surface of the magnetic head. A reflected beam (246) is received by the TV camera. The spacing between the magnetic head and the disk surface can be calculated from the drop in intensity of reflected light.

14 Claims, 7 Drawing Sheets

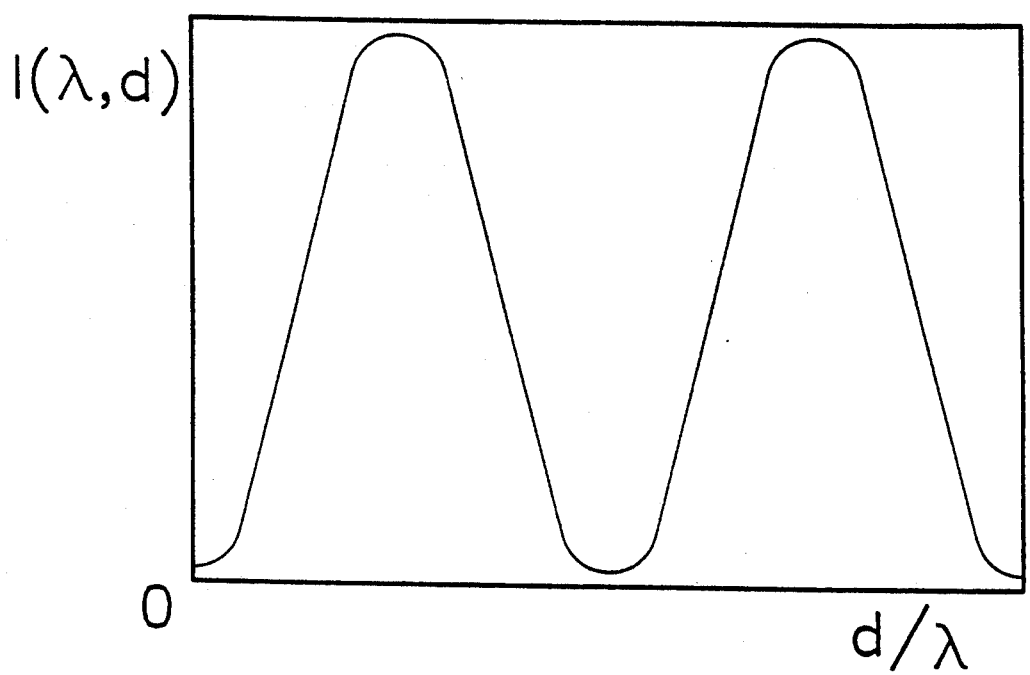
Fig. 1, PRIOR ART
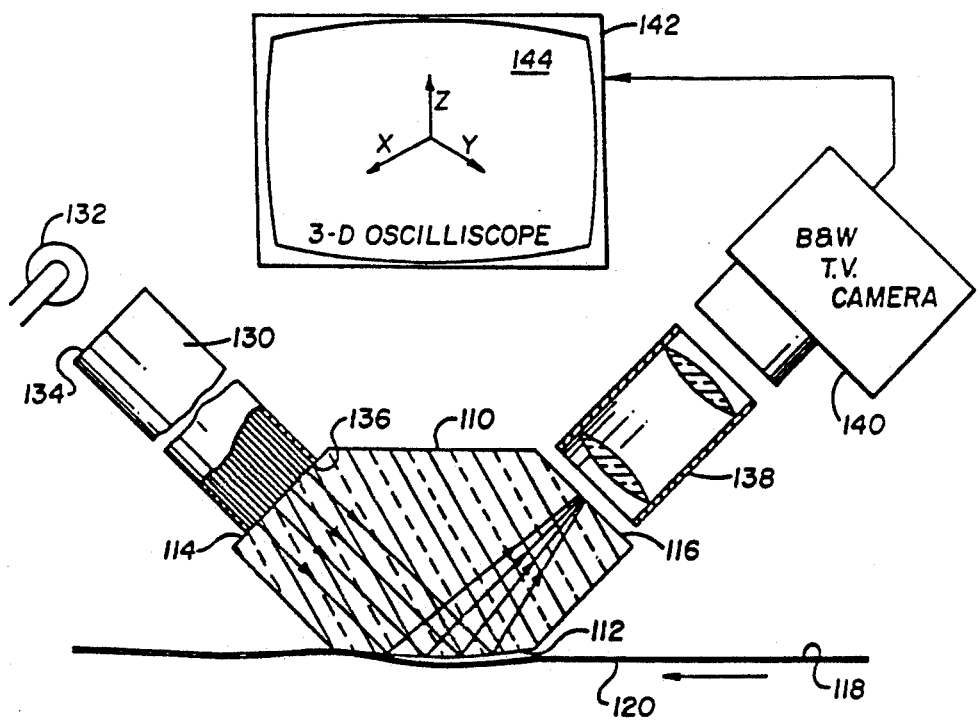
Fig. 2, PRIOR ART

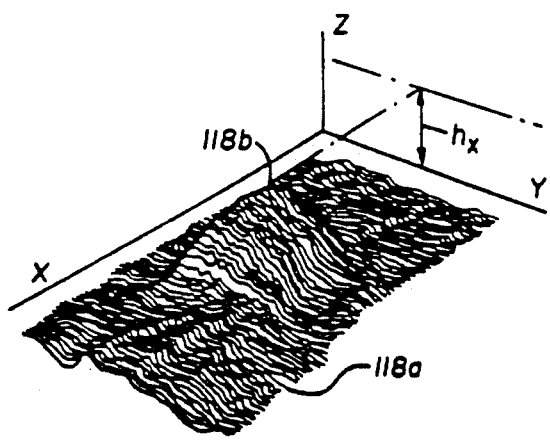
Fig. 3, PRIOR ART
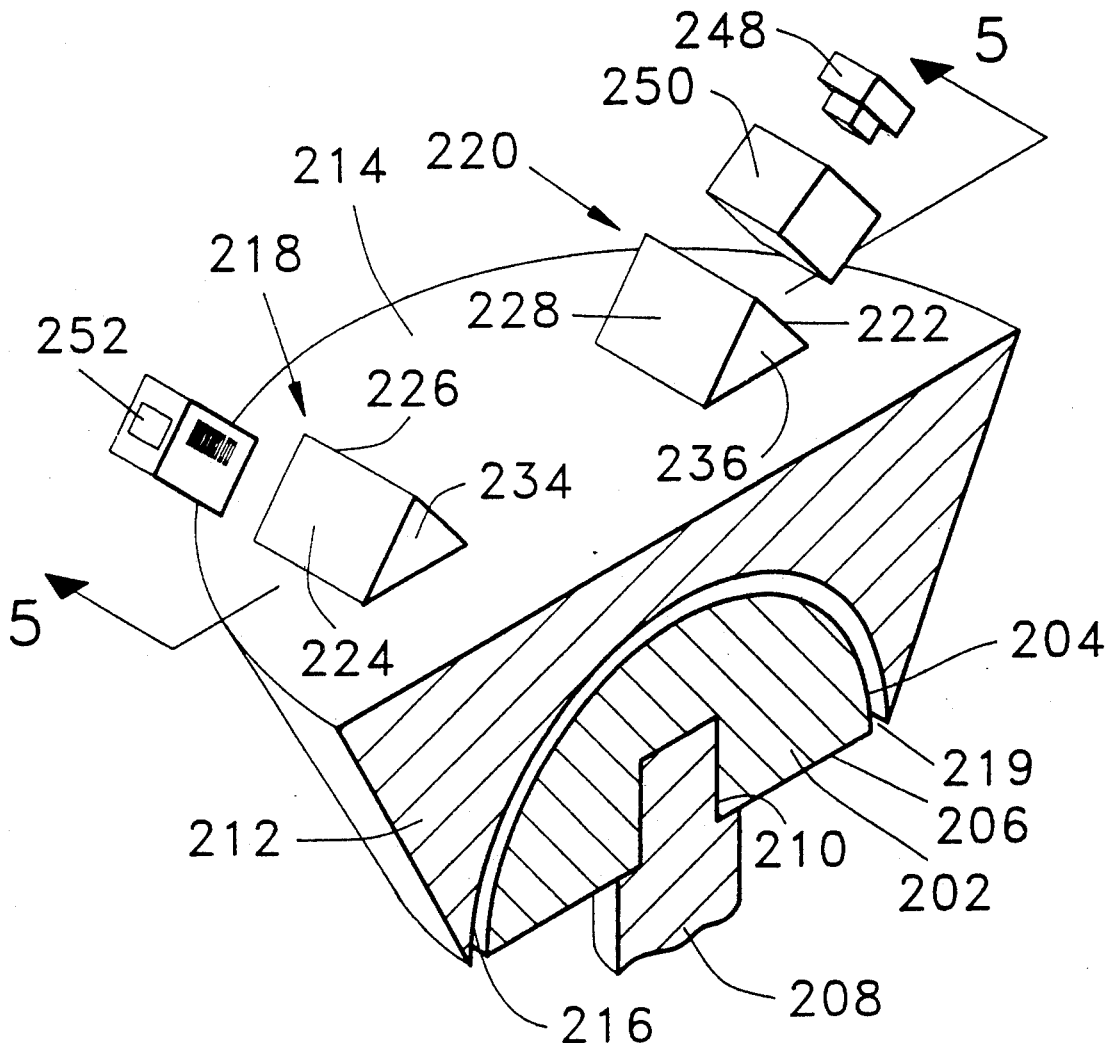
Fig. 4

APPARATUS FOR MEASURING NANOMETRIC DISTANCES EMPLOYING FRUSTRATED TOTAL INTERNAL REFLECTION

BACKGROUND

1. Field of Invention

The present invention relates to the field of linear measurement, specifically to optical methods of measuring nanometric distances between objects, such as a transducing head and a magnetic storage disk, that participate in relative motion.

2. Prior Art

At the present time, several optical techniques are used to measure a nanometric (microscopic) spacing between objects, e.g., between a magnetic head and disk of a computer disk drive. The smaller is the aforementioned spacing, the more accurate is the transduction of information stored on the recording media, i.e., the computer disk.

One measuring method is based on the phenomenon of interference between light beams, which is called optical interferometry. Interference is the mutual effect on meeting of two wave trains of light of the same type so that such wave trains produce lines, bands, or fringes either alternately light and dark or variously colored. When measuring separation between two objects having nearly parallel mutually facing surfaces, where one of the objects is transparent, a beam of light is directed into the gap to be measured through the body of the transparent object in such a way that the axis of the beam is essentially normal to the facing surfaces. Beams, reflected from the surfaces, are ultimately recombined at a detector element. The optical system is designed so that the path difference between the beams is related to the spacing the instrument is intended to measure. It is known from optics that the fraction of the original radiation collected by the detector depends in part on the ratio of the path difference to the radiation wavelength. This relationship is used as a calibration table for spacing measurements.

A particular application of optical interferometry, disclosed in U.S. Pat. No. 4,813,782 to Yagi et al., 1989, is the measurement of the nanometric space between a magnetic head of a computer hard disk drive and a flat reference disk. To simulate the working conditions of a hard disk drive, the reference disk is rotated at a high speed and the head, pressed downward by a spring, floats above the disk on a dense air cushion, which is created by the rotation of the disk. The head thus "flies" or has a "flight elevation" above the reference disk, so that the reference disk is used to dynamically test the flying behavior of the magnetic head. The reference disk is made of an optically transparent material, such as glass, and the light beam is directed through the disk from the side opposite to the magnetic head. Components of the beam, reflected from surfaces bounding the air cushion, eventually produce interference.

The main drawback of the above method is the inaccuracy of the calibration table, illustrated in FIG. 1, near its minimum and maximum points, where the flat regions in the curve significantly degrade measurement precision. Specifically, this is the case when the separation between the head and the disk approaches one quarter of the optical wavelength. Moreover, commercially available devices are unable to take measurements at several points on the magnetic head at a time. Therefore, time consuming point-by-point measurements have to be performed in order to obtain a map of surface-to-surface proximity. Currently, 90 nanometers is the smallest space that can be reliably measured using a commercially available spectrophotometric instrument to measure the spectral intensity distribution of the reflected light.

Another optical method that is used to measure the space between objects is known as frustrated total internal reflection. Total internal reflection may be observed when a light beam falls onto an interface between two media at an oblique incidence angle. If the light originates from the side of the denser of the two media and the incidence angle exceeds a certain critical value, all radiation energy is reflected back into the medium in which it originated.

It is further known that if the second medium is present in the form of a thin film and is followed by a third medium, which is more dense than the second, a part of the incident radiation can penetrate through the film and propagate into the third medium. The latter phenomenon is known as frustrated total internal reflection. In this case the fraction of radiation reflected back into the first medium is determined in part by the ratio of the thickness of the second medium to the radiation wavelength, in part by the complex refractive index of the third medium, and also by the polarization of incident radiation.

An apparatus which determines the proximity of a stationary glass surface to another surface by employing the phenomenon of frustration of total internal reflection of light energy from the glass surface is disclosed in U.S. Pat. No. 4,681,451 to John M. Guerra and William T. Plummer, 1987. The device, shown schematically in FIG. 2, is used to determine the gap between a magnetic head and a magnetic recording medium. In the mechanism, a glass block 110 is substituted for the conventional magnetic head, and a medium 120, e.g., a magnetic disk, may be set into motion to develop aerodynamic characteristics incident to establishing the spacing between a surface 118 and a glass surface 112. An optical fiber bundle 130 directs collimated light from a source 132 into block 110 through a planar surface 114. The pattern of light presented at a surface 116 as a result of total internal reflection from surface 112, due to proximity of surface 118 with surface 112, is magnified by a microscope 138. The enlarged image produced by microscope 138 is converted to a facsimile in which gray scale densities at coordinate locations throughout the area of the magnified image are recorded by a black-and-white television camera 140. The electronic facsimile of the image is fed into a three-dimensional oscilloscope 142. The image (FIG. 3) generated by the oscilloscope is directly convertible to a measurement of surface proximity.

The main disadvantage of this proximity imaging device is its inability to test the dynamic behavior and to measure the flight elevation of an actual magnetic head, as may be needed by a magnetic head manufacturer or consumer for quality control purposes. Even though the conditions inside a hard disk drive can be simulated by executing a replica of the head in glass, the results obtained in this manner are theoretical since physical properties, e.g., weight, of the glass head are different from those of an actual head. Furthermore, fiber-optic attachments, secured to the glass head, change its aerodynamic properties. Thus, the apparatus can not be used to test the characteristics of an actual head.

OBJECTS AND ADVANTAGES

It is accordingly an object of the invention to provide an apparatus for measuring nanometric distances, employing the phenomenon of frustration of total internal reflection, which overcomes the foregoing disadvantages. Other objects are to provide an apparatus which can measure the flight elevation and test the dynamic behavior of an actual magnetic head for purposes of production and quality control, which has a significantly nonzero gradient of the calibration table allowing high calibration resolution, and which is relatively inexpensive to manufacture. Further objects and advantages will become apparent after consideration of the ensuing description and the accompanying drawings.

DRAWING FIGURES

FIG. 1 is a plot of a periodic calibration curve used to obtain the spacing between two objects when the prior-art phenomenon of optical interference is utilized.

FIG. 2 is a schematic drawing of a prior-art optical proximity imaging device.

FIG. 3 is an illustration approximating the characteristics of an image generated by a prior-art device which employs the phenomenon of frustrated total internal reflection.

FIG. 4 is a schematic drawing of a nanometric distance measuring device of the invention having a two-piece reference disk construction and two coupling prisms.

Figure 5:
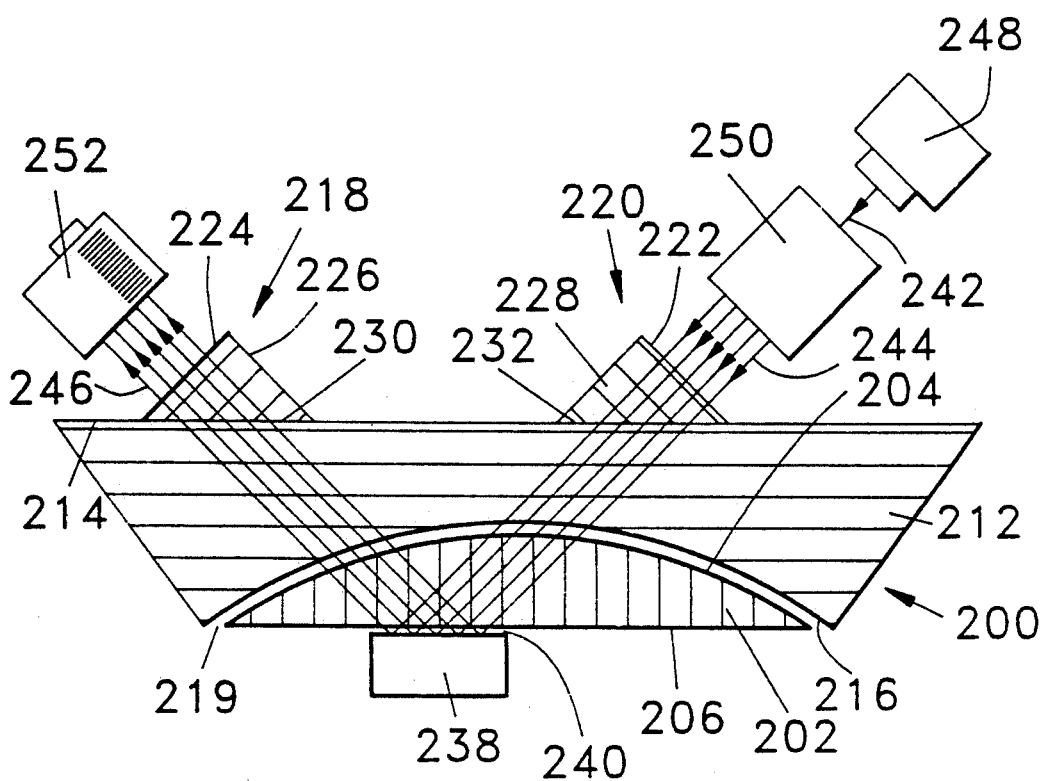
FIG. 5 is a cross-sectional view along lines 5—5 of FIG. 4.

It is to be noted that for purposes of illustration, these figures are not necessarily drawn to scale.

REFERENCE NUMERALS USED IN THE DRAWINGS AND DESCRIPTION

200—two-piece reference disk
202—inner disk
204—convex spherical surface
206, 268, 296—flat bottom surface
208—spindle
210, 276, 298—opening
212—coupling lens
214—planar circular surface
216—concave spherical surface
219, 240, 266, 290, 292, 300—gaps
218, 220, 258—prisms
222, 224—plane surfaces
225—useful measurement area
226, 228—non-working surfaces
230, 232, 264—contact surfaces
234, 236—end faces
238—magnetic head
242, 278—light beams
244, 280—wide parallel beams
246, 282—reflected beams
248—colored-light source
250—beam expander
252—TV camera
254—laser-light source
256—diffraction grating
257, 259—objective lens systems
244', 244''—diffracted rays
246', 246''—reflected rays
261—sensor elements
260, 262—planar surfaces
270—annular reference disk with spherical surface elements
272—concave spherical surface element
274—convex spherical surface element
284—white-light source
286—plano-convex lens
288—plano-concave lens
294—annular reference disk with conical surface elements

FIGS. 4 THROUGH 8—DESCRIPTION—NANOMETRIC DISTANCE MEASURING DEVICE WITH A TWO-PIECE REFERENCE DISK AND TWO COUPLING PRISMS

A schematic drawing of the preferred embodiment of a nanometric distance measuring device according to the invention is shown in FIG. 5.

The apparatus includes a two-piece glass reference disk, broadly denoted by reference numeral 200. An inner disk 202, comprising a convex spherical surface 204 and a flat bottom surface 206, is rigidly mounted onto a spindle 208 through an opening 210 (FIG. 4). Spindle 208 is driven by an electric motor (not shown). A coupling lens 212, having a planar circular top surface 214 and a concave spherical surface 216, is fixed above disk 202 so that a near uniform gap 219 is formed between surfaces 204 and 216. Surfaces 204, 206, 214, and 216 are polished to optical quality of better than 10 nm rms, and surfaces 204 and 216 are also coated with an optically antireflective coating (not shown). Two prisms, broadly denoted by numerals 218 and 220, have plane surfaces 222 and 224, nonworking surfaces 226 and 228, and contact surfaces 230 and 232 which rest on surface 214 and provide optical contact between the prisms and lens 212. The optical contact between the prisms and the lens may be produced by means of a thin layer of optical glue or immersion oil (not shown) placed between surfaces 230 and 232 and surface 214. Surfaces 222, 224, 230, and 232 are polished to optical quality. Surfaces 222 and 224 are coated with an optically antireflective coating (not shown). Prisms 218 and 220 are aligned in such a way that their end faces 234 and 236 lie in the same plane (FIG. 4).

A magnetic head 238 is suspended with a gap 240 under flat bottom surface 206.

The optical system of the nanometric distance measuring device of the invention is used to manipulate a light beam 242, a wide parallel beam 244, and a reflected beam 246. It includes a colored-light source 248, which is aimed at surface 222 at near normal incidence. A beam expander 250 is placed between light source 248 and surface 222, while a TV camera 252 is positioned opposite polished surface 224 (FIG. 4).

Figure 6:
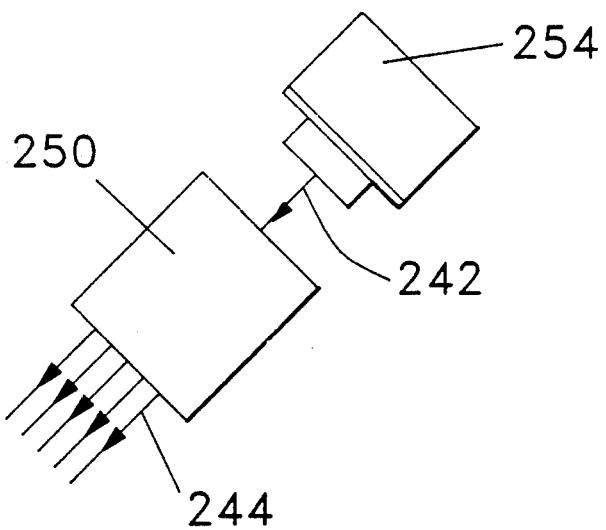
FIG. 6 is a schematic illustration of a variation of the optical system shown in FIG. 5.

Several variations of the optical system described above may be utilized with two-piece reference disk 200. FIG. 6 shows a configuration in which colored-light source 248 (FIG. 5) is substituted with a laser-light source 254. In another possible arrangement (FIG. 7) a diffraction grating 256 is used instead of beam expander 250 and sensor elements 261 replace camera 250. In this case, objective lens systems 257 and 259 are utilized. When diffraction grating 256 is employed, incident beam 242 is split into several rays. However, only two diffracted rays, i.e., 244' and 244", and two reflected rays, i.e., 246' and 246", are shown for simplicity. Moreover, the colored-light source 248 of FIG. 7 can be substituted with laserlight source 254, as shown in FIG. 8.

Figure 5A:
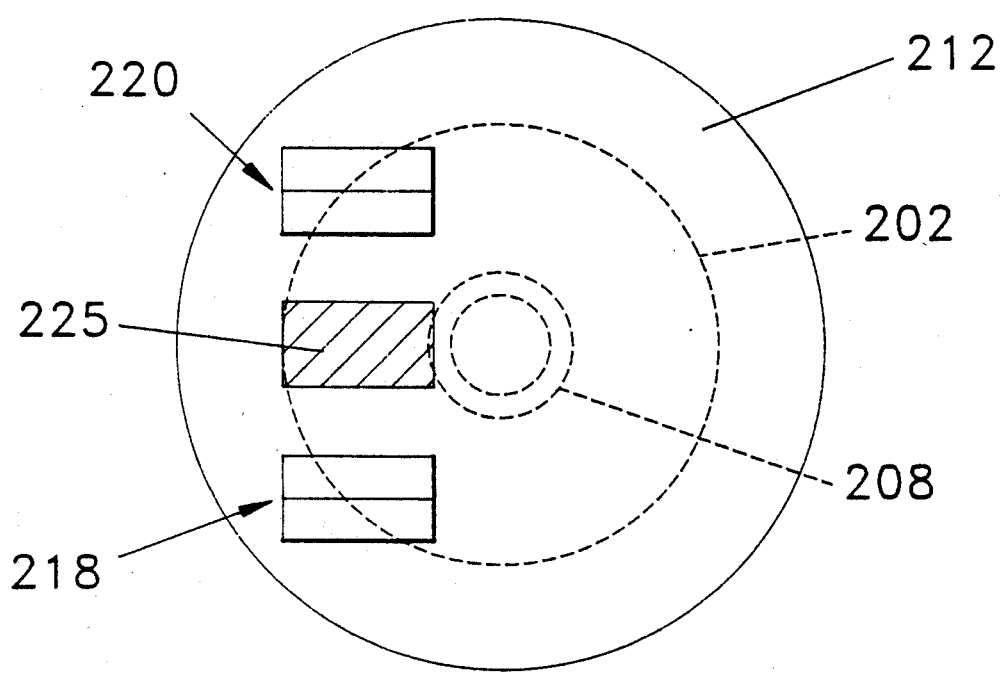
FIG. 5a is a top view of a nanometric distance measuring device of the invention having a two-piece reference disk construction and two coupling prisms.

The two-piece construction of the reference disk and the spatial arrangement of the prisms and the coupling lens maximizes useful measurement area 225 of the device, particularly near the center of surface 206 (FIG. 5), as shown in FIG. 5a.

Reference disk 200 can also be made of plastic or a crystalline material which behaves as a homogeneous transparent dielectric with respect to optical radiation used in the apparatus.

In one specific embodiment of the invention, schematically shown in FIGS. 4 and 5, inner disk 202 has an outside diameter of approximately 160 mm and a thickness of about 75 mm and the coupling lens is approximately 40 mm thick.

FIGS. 4 THROUGH 10—OPERATION—NANOMETRIC DISTANCE MEASURING DEVICE WITH A TWO-PIECE REFERENCE DISK AND TWO COUPLING PRISMS

As spindle 208 rotates inner disk 202, coupling lens 212 remains stationary. Head 238 floats on a dense air cushion, created by the high speed rotation of inner disk 202, and is separated by gap 240 from bottom surface 206.

Beam 242, originating from source 248, forms an angle close to 45° with respect to surface 206. Beam expander 250 converts beam 242 into a wide parallel beam 244, which is collinear with beam 242. Beam 244 is reflected from surface 206 and reaches TV camera 252. The area of surface 206 immediately above magnetic head 238, where frustration of total internal reflection occurs, is imaged into sensors (not shown) of TV camera 252 by the optics between the prism and the camera. The two-dimensional intensity distribution, which is due to frustrated total internal reflection effects between surface 206 and head 238, is recorded by the camera and is used to create a 3-D surface proximity map of head 238 and surface 206.

Beam 244 enters coupling lens 212 through surface 222 at near normal incidence and passes through disk 202. Beam 244 is directed at the surface of head 238 where gap 240 is to be measured. All rays arriving at the area of interest above head 238 are directed at angles close to 45° with respect to surface 206. Since 45° exceeds the critical total internal reflection angle for glass and air, which is approximately 41°, intensity of light, reflected back into disk 202 from bottom surface 206, is representative of the width of gap 240 between head 200 and surface 206.

Reflected beam 246 emerges through planar surface 214 and exits through plane 224 of prism 218. The brightness of the reflected light, registered by TV camera 252, will be at its maximum until magnetic head 238 is brought within a close proximity to the point where beam 244 suffers total internal reflection. From the drop in intensity of reflected light, which is the result of the frustration of total internal reflection, the spacing between the magnetic head and the disk surface can be derived using a calibration curve similar to those shown in FIGS. 9 and 10. Moreover, light polarizations other than those illustrated in FIGS. 9 and 10 can also be utilized. Known simple methods can be used to change the polarization of a light beam in order to select a suitable relationship for more precise measurements in a particular spacing range. With appropriate polarization, spacing down to 0 nm can be accurately measured.

Prisms 218 and 220 remain stationary, allowing the rest of the optical system to translate in a horizontal plane, so that measurement points can be moved along surface 206 with little change in incidence angles.

Figure 7:
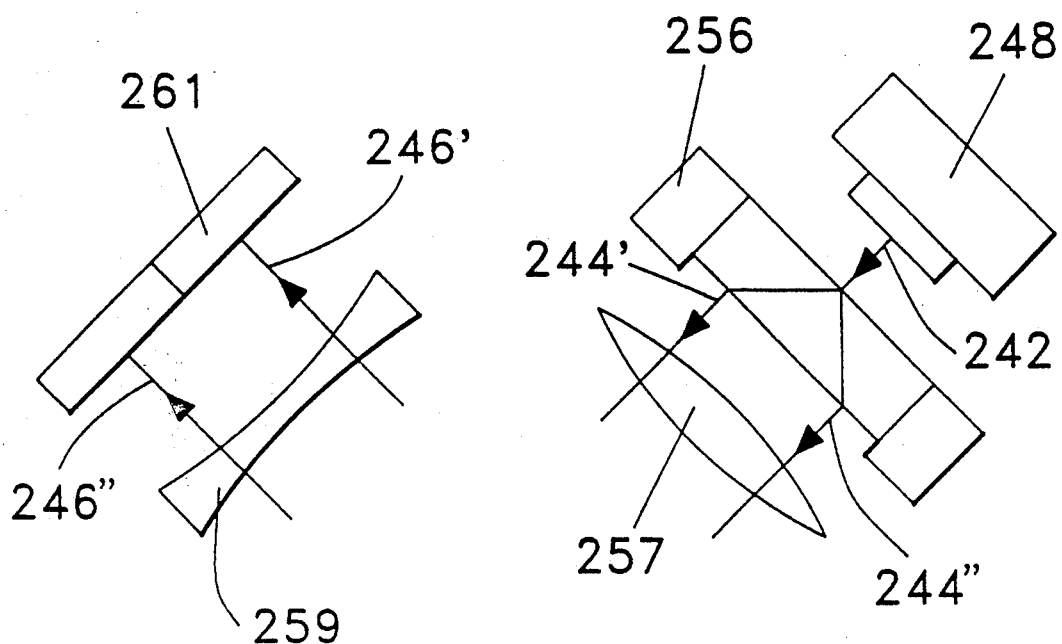
FIG. 7 is a schematic drawing of another variation of the optical system shown in FIG. 5.
Figure 8:
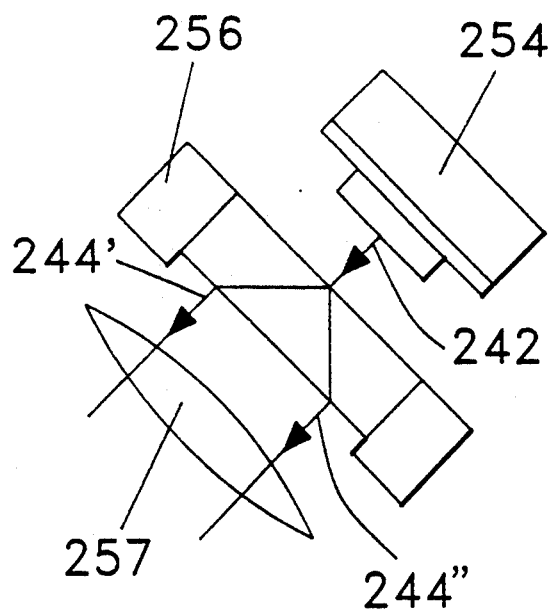
FIG. 8 is a schematic drawing of a variation of the optical system shown in FIG. 7.
Figure 9:
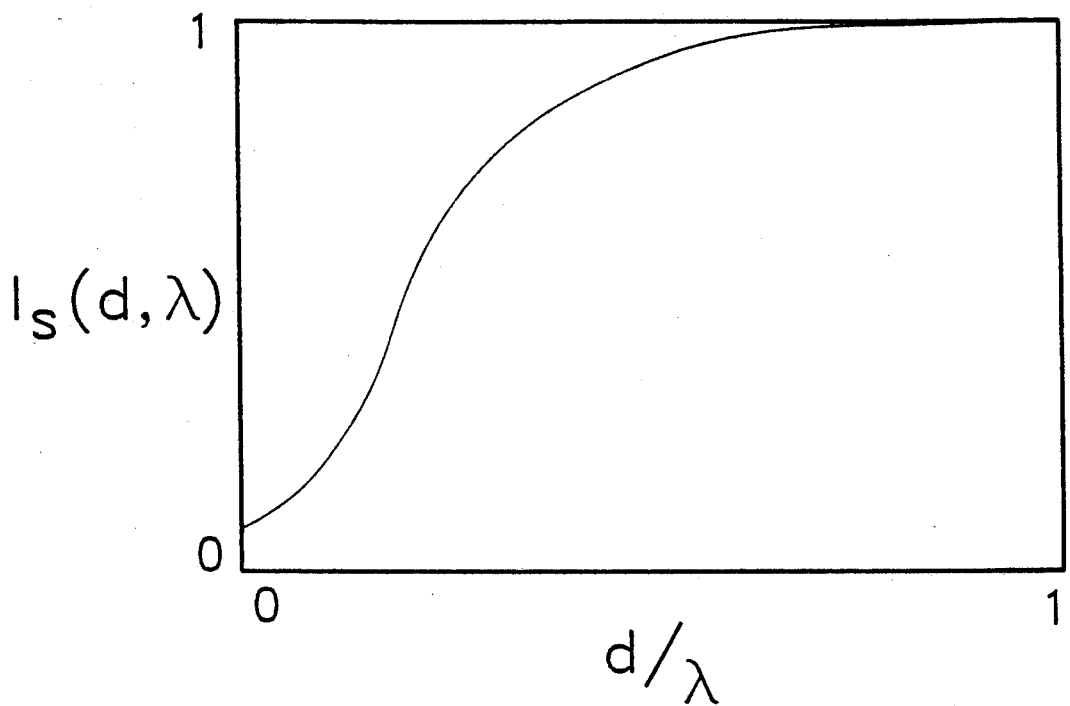
FIG. 9 is a plot of a calibration curve where s-type polarization of light is used to obtain the spacing between two objects when the phenomenon of frustrated total internal reflection is employed.
Figure 10:
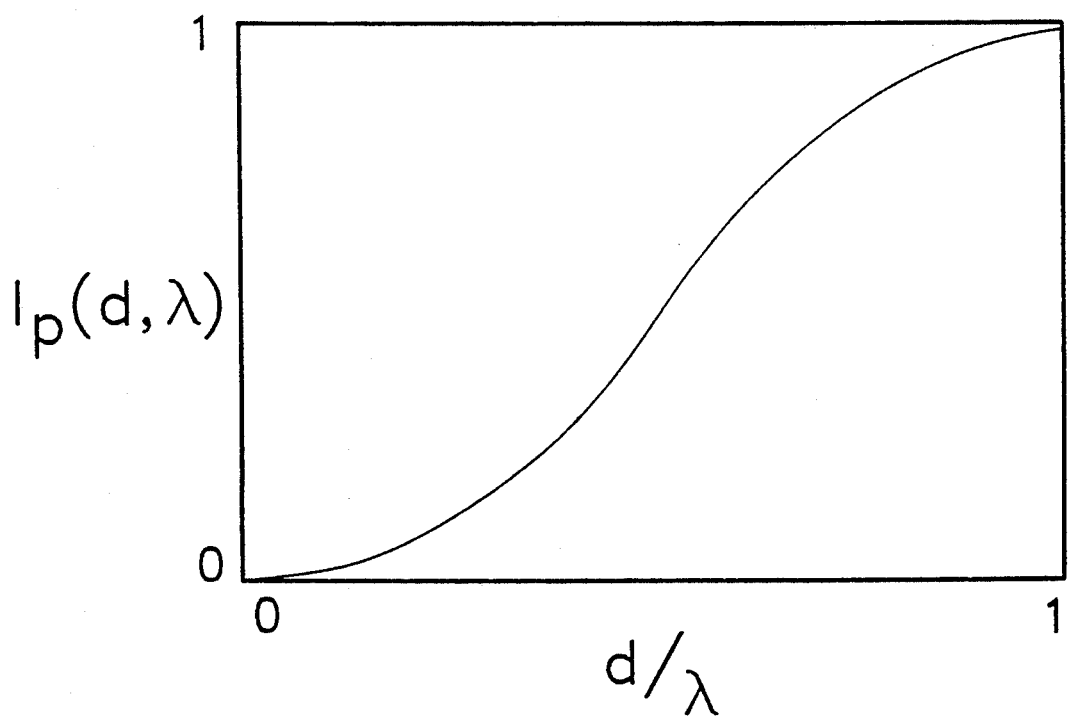
FIG. 10 is a plot of a calibration curve where p-type polarization of light is used to obtain the spacing between two objects when the phenomenon of frustrated total internal reflection is utilized.

Alternatively, the optical systems depicted in FIGS. 6, 7, and 8 can be utilized to determine the spacing between the head and the reference disk.

Figure 11:
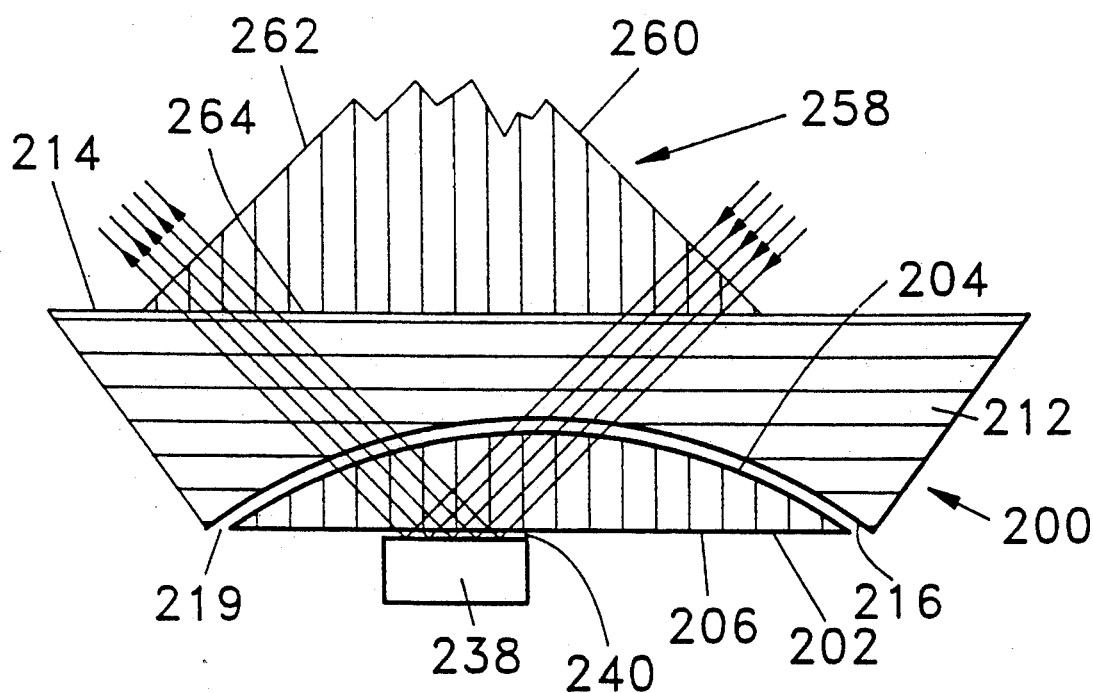
FIG. 11 is a schematic illustration of a nanometric distance measuring device of the invention having a two-piece reference disk construction and one coupling prism.

FIG. 11—DESCRIPTION—NANOMETRIC DISTANCE MEASURING DEVICE WITH A TWO-PIECE REFERENCE DISK AND ONE COUPLING PRISM

FIG. 11 shows another embodiment of the apparatus of the invention. In this case, coupling prisms 218 and 220 are replaced with a single prism, broadly denoted by reference numeral 258. Prism 258 contains planar surfaces 260 and 262, as well as a contact surface 264, which rests on surface 214 and provides optical contact between prism 258 and lens 212. Surfaces 260, 262, and 264 are polished to optical quality. The substitution eliminates the need to align the two individual prisms.

The optical system shown in FIG. 5, as well as the variations thereof (FIGS. 6, 7, and 8), can be utilized with this embodiment of the invention.

FIG. 11—OPERATION—NANOMETRIC DISTANCE MEASURING DEVICE WITH A TWO-PIECE REFERENCE DISK AND ONE COUPLING PRISM

The operation of this embodiment of the invention is virtually identical to that of the embodiment depicted in FIGS. 4 through 8 with the difference that light rays enter the reference disk through surface 260 and exit through surface 262.

Figure 12:
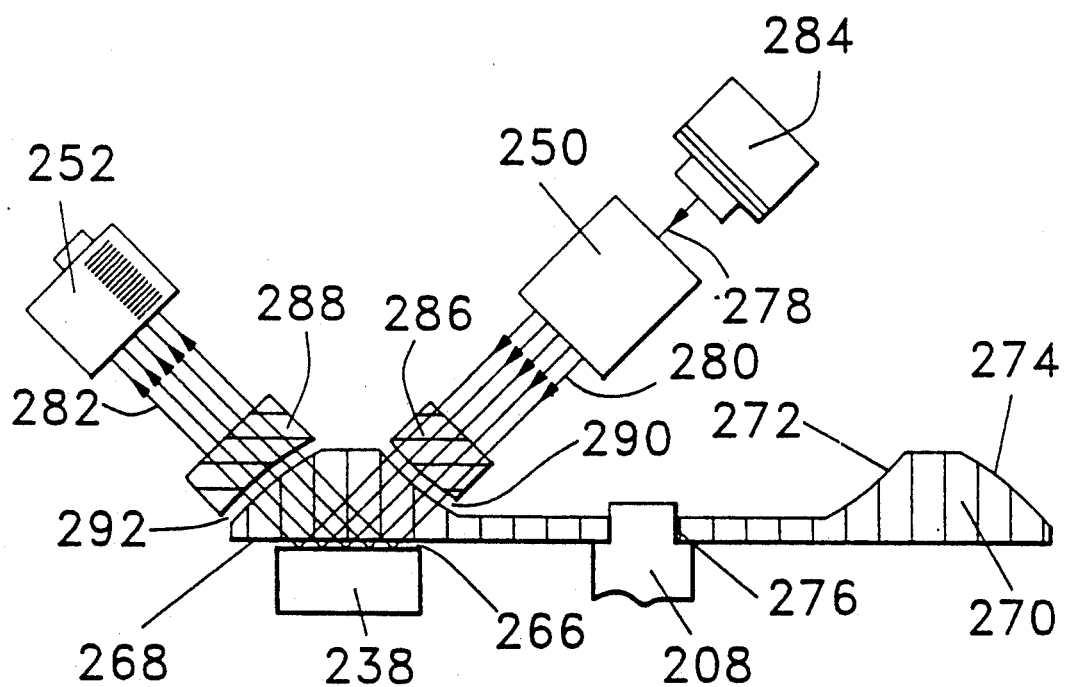
FIG. 12 is a schematic drawing of a nanometric distance measuring device of the invention having a one-piece reference disk with spherical surface elements.

FIG. 12—DESCRIPTION—NANOMETRIC DISTANCE MEASURING DEVICE HAVING A ONE-PIECE REFERENCE DISK WITH SPHERICAL SURFACE ELEMENTS

A schematic drawing of a nanometric distance measuring device having a one-piece reference disk with spherical surface elements is shown in FIG. 12.

The apparatus includes a magnetic head 238 which is suspended with a gap 266 over a flat bottom surface 268 of a glass reference disk 270. Annular disk 270 contains spherical surface elements 272 and 274, where surface element 272 is concave and surface element 274 is convex. Elements 272 and 274 are polished to optical quality. Disk 270 is mounted on a spindle 208 through a centrally located cylindrical opening 276. The spherical shape of surfaces 272 and 274 constitutes an important advantage, since spherical surfaces are commonly used in optics, and manufacturing and polishing techniques are readily available for this purpose.

The optical system of a nanometric distance measuring device of the invention is used to manipulate a light beam 278, a wide parallel beam 280, and a reflected beam 282. It includes a white-light source 284, which is aimed at spherical surface element 272 at near normal incidence. A beam expander 250 is placed in front of light source 284. Plano-convex and planoconcave lenses 286 and 288, with curvatures matching those of respective spherical surface elements 272 and 274, are situated at the periphery of disk 270, forming gaps 290 and 292 with the disk surface. A TV camera 252 is placed opposite plano-concave lens 288.

FIG. 12—OPERATION—NANOMETRIC DISTANCE MEASURING DEVICE HAVING A ONE-PIECE REFERENCE DISK WITH SPHERICAL SURFACE ELEMENTS

In Operation, spindle 208 rotates reference disk 270 in a horizontal plane, while magnetic head 238 is pressed to surface 268. Head 238 floats on a dense air cushion, created by the high speed rotation of disk 270, and forms gap 266 with surface 268.

Beam 278, originating from source 284, is directed at concave surface 272 and forms an angle of approximately 45. with surface 268. Beam expander 250 converts beam 278 into a wide parallel beam 280. Thus, with additional use of TV camera 252, simultaneous measurements are made at a plurality of distinct points on head 238.

Beam 280 passes through lens 286 and disk 270 and is directed at the surface of magnetic head 238 where gap 266 is to be measured. All rays arriving at the area of interest above head 238 are directed at angles close to 45° with respect to surface 268. Intensity of light, reflected back into disk 270 from surface 268, is representative of the width of gap 266 between head 238 and surface 268.

Reflected beam 282 exits the body of the reference disk through spherical surface 274 and passes through plano-concave lens 288, which directs it into TV camera 252.

Lenses 286 and 288 are positioned close to matching surfaces 272 and 274 and remain stationary, allowing the rest of the optical system to translate in a horizontal plane. Thus, measurement points can be moved along the periphery of surface 268 with little change in incidence angles.

Figure 13:
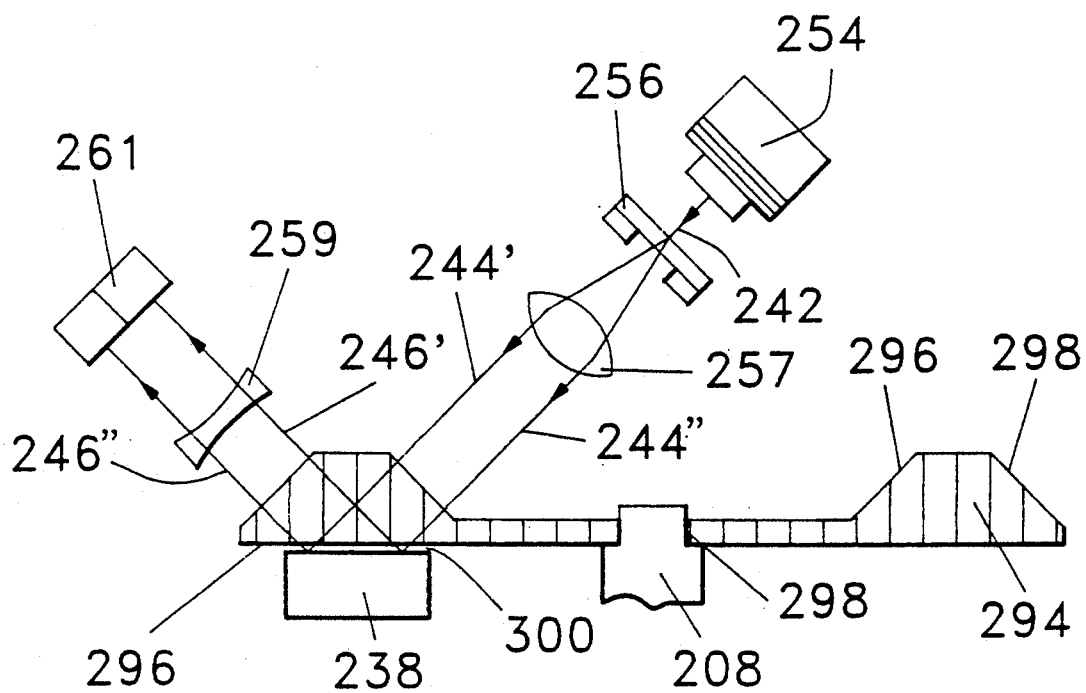
FIG. 13 is a schematic drawing of a nanometric distance measuring device of the invention having a one-piece reference disk with conical surface elements.

FIG. 13—DESCRIPTION—NANOMETRIC DISTANCE MEASURING DEVICE HAVING A ONE-PIECE REFERENCE DISK WITH CONICAL SURFACE ELEMENTS

A schematic view of a nanometric distance measuring device having a one-piece reference disk with conical surface elements is shown in FIG. 13.

A transparent reference disk 294 contains conical elements 296 and 298, which replace spherical elements 272 and 274 of disk 270, and a flat bottom surface 296. Elements 296 and 298, as well as surface 296, are polished to optical quality. Disk 294 is mounted on spindle 208 through a centrally located opening 298. Magnetic head 238 is suspended over surface 296 with a gap 300.

The optical system of this embodiment of the invention is used to manipulate light beam 242, diffracted rays 244' and 244", and reflected rays 246' and 246". It includes laser-light source 254 which is aimed at conical surface element 296 at near normal incidence. Diffraction grating 256, placed in front of light source 254, is followed by an objective lens system 257. Sensor element 261 is situated opposite disk surface 298 and objective lens system 259 is positioned between the sensor element and surface 298.

FIG. 13—OPERATION—NANOMETRIC DISTANCE MEASURING DEVICE HAVING A ONE-PIECE REFERENCE DISK WITH CONICAL SURFACE ELEMENTS

In operation, spindle 208 rotates disk 294 in a horizontal plane, while magnetic head 238 is pressed to surface 296.

Beam 242, originating from source 254, is diffracted into several rays by diffraction grating 256, thus making simultaneous measurements at several distinct points on head 238. However, only two beams, i.e., beams 244' and 244", are shown for clarity.

Rays 244' and 244" enter the body of disk 294 through conical surface 296. With the help of lens system 257 they are focused at selected points of interest at the surface of magnetic head 238 where gap 300 is to be measured.

Reflected rays 246' and 246" emerge out through conical surface 298 and are focused by lens system 259 onto sensor elements 261, which record the intensity of the rays.

Conical surfaces 296 and 298 allow the optical system to translate in a radial direction and rotate around the axis of spindle 208, so that measurement points can be moved along surface 296 with little change in incidence angles.

It is to be noted that the optical system employed in the previous embodiment of the invention is equivalent to the one described above. Several optical configurations, including those with laser, white, or colored light sources, can be successfully utilized.

SUMMARY, RAMIFICATIONS, AND SCOPE

Thus, it has been shown that we have provided a greatly improved apparatus for measuring nanometric distances, employing frustrated total internal reflection. The apparatus can measure the flight elevation and test the dynamic behavior of an actual magnetic head. It has a significantly nonzero gradient of the calibration table, i.e., the calibration curve has no flat regions, allowing high calibration resolution. Moreover, the apparatus is relatively inexpensive to manufacture.

Although the device for measuring nanometric distances has been shown and described in the form of several specific embodiments, its parts, materials, and configurations are given only as examples, and many other modifications of the apparatus are possible. For example, materials other than glass can be used to manufacture the reference disk and other optical elements of the apparatus, for instance, plastic, crystal, etc. The elements comprising the surface of a one-piece reference disk which utilizes plano-concave and plano-convex lenses can be spherical, or can comprise any surface of revolution, the axis of which is centered along the rotational axis of the spindle. The light source of the apparatus can be an emitter producing different bandwidths and frequencies of light, e.g., a laser radiation source, a white light emitter, or a source of colored light. Laser radiation sources, such as diode lasers or gas lasers, may be utilized. Other light sources, such as gas-discharge lamps, tungsten lamps, and LEDs can be also used. If the utilized radiation bandwidth is limited, a matching bandpass filter, e.g., an interference filter, can be incorporated in front of the light-sensing elements in order to better isolate them from undesirable external radiation. Moreover, the objective lens systems, the diffraction grating, and the sensor elements can be replaced by a beam expander and a TV camera. A pulsed-light source and/or an electronic control of the light-sensing elements can be used to freeze the motion of a dynamically unstable head or to measure induced head oscillations. Furthermore, the incidence angle of incoming radiation with respect to the surfaces whose proximity is being measured does not have to be exactly 45°. Any angle at which the phenomenon of frustrated total internal reflection can be observed is useful for purposes of proximity measurements. Therefore, the scope of the invention should be determined, not by the examples given, but by the appended claims and their legal equivalents.

What we claim is:

1. An apparatus, employing the phenomenon of frustration of total internal reflection, for measuring nanometric distances between two objects, comprising:
    a transparent annular disk having an axis of rotation, a flat surface, a concave spherical surface, a convex spherical surface, and a central opening, said flat surface being orthogonal to said axis of rotation;
    an electric motor output shaft, said central opening of said transparent annular disk being mounted onto said output shaft;
    a transducing head of a computer disk drive, said transducing head being positioned in close proximity to said flat surface of said transparent annular disk; and
    light-guiding means for manipulating light-beams, said light-guiding means including a white-light source, a beam expander, a system of lenses, and an image sensor, said white-light source being aimed at said concave spherical surface, said white-light source being followed by said beam expander, said image sensor being positioned opposite said convex spherical surface of said transparent annular disk, whereby said apparatus provides elevated measurement accuracy, high calibration resolution, and the ability to measure flight elevation and to test dynamic behavior of an actual transducing head for purposes of production and quality control.

2. The apparatus of claim 1 wherein said flat surface and said concave spherical and convex spherical surfaces of said transparent annular disk have surface finishes of optical quality and wherein said transparent annular disk is made of a material selected from the class consisting of glass, plastic, and crystalline materials.

3. The apparatus of claim 1 wherein said system of lenses includes a plano-convex lens and a plano-concave lens, said plano-convex lens being positioned between said beam expander and said concave spherical surface, said plano-concave lens being placed between said image sensor and said convex spherical surface of said transparent annular disk.

4. The apparatus of claim 1 wherein said image sensor is a television camera.

5. An apparatus, employing the phenomenon of frustration of total internal reflection, for measuring nanometric distances between two objects, comprising:
    a transparent annular disk having an axis of rotation, a flat surface, an outer conical surface, an inner conical surface, a central opening, said flat surface being orthogonal to said axis of rotation;
    drive means for rotating said transparent annular disk around said axis of rotation;
    a transducing head of a computer disk drive, said transducing head being positioned in close proximity to said flat surface; and
    light-guiding means for manipulating light beams, said light guiding means comprising a laser-light source, a diffraction grating, a system of lenses, and a plurality of sensor elements, said laser-light source being aimed at said inner conical surface, said diffraction grating being positioned between said inner conical surface and said laser-light source, said sensor elements being situated opposite said outer conical surface, whereby said apparatus provides elevated measurement accuracy, high calibration resolution, and the ability to measure flight elevation and to test dynamic behavior of an actual transducing head for purposes of production and quality control.

6. The apparatus of claim 5 wherein said flat surface and said outer and inner conical surfaces of said transparent annular disk have surface finishes of optical quality.

7. The apparatus of claim 5 wherein said drive means comprises an output shaft of an electric motor, said central opening of said transparent annular disk being mounted onto said output shaft.

8. The apparatus of claim 5 wherein said transparent annular disk is made of a material selected from the class consisting of glass, plastic, and crystalline materials.

9. The apparatus of claim 5 wherein said system of lenses includes a first objective lens system and a second objective lens system, said first objective lens system being positioned between said diffraction grating and said inner conical surface, said second objective lens system being placed between said sensor elements and said outer conical surface.

10. A method of measuring a separation between a flat surface of a rotating transparent body and a surface of an object having an arbitrary transparency, said rotating transparent body having an axis of rotation and transparent means for transmitting in and out of said rotating transparent body optical radiation, said optical radiation being obliquely directed with respect to said axis of rotation, said flat surface being orthogonal to said axis of rotation and having a total internal reflection angle, said method comprising the steps of:
    directing an incident optical radiation through said transparent means into said rotating transparent body at an angle to said flat surface, said angle exceeding said total internal reflection angle so that substantially all of said incident optical radiation is reflected from said flat surface back into the interior of said rotating transparent body and out though said transparent means as a reflected optical radiation;

frustrating said reflected optical radiation by placing said surface of said object near said flat surface; and comparing the intensity of said incident optical radiation with the intensity of said reflected optical radiation, thereby to determine said separation from the intensity difference between said incident optical radiation and said reflected optical radiation, whereby said method provides elevated measurement accuracy, high calibration resolution, and the ability to measure flight elevation and to test dynamic behavior of an actual transducing head for purposes of production and quality control.

11. The method recited in claim 10 wherein said object is a magnetic head of a computer disk drive.

12. An apparatus, employing the phenomenon of frustration of total internal reflecting, for measuring nanometric distances between two objects, comprising:

a transparent disk having an axis of rotation, a central opening, a convex spherical top surface, and a bottom planar surface, said axis of rotation being substantially orthogonal to said bottom planar surface;

an output shaft of an electric motor, said central opening of said transparent disk being mounted onto said output shaft, whereby said transparent disk is rotated by said output shaft;

a transducing head of a computer disk drive positioned in close proximity to said bottom planar surface of said transparent disk;

a transparent lens having a concave spherical bottom surface and a top planar surface, said top planar surface being substantially orthogonal to said axis of rotation, said concave spherical bottom surface having the same curvature as said convex spherical top surface of said transparent disk, said concave spherical bottom surface being separated from said convex spherical top surface by a uniform gap which is small in relation to the curvature of said concave spherical bottom surface;

a transparent prism having a first and a second inclined working face and a bottom face, said bottom face being in optical contact with said top planar surface of said transparent lens; and a colored-light source, a diffraction grating, and a television camera, said colored-light source being aimed at essentially normal incidence at said first inclined working face of said transparent prism and emitting incident light beams into the body of said transparent disk, said diffraction grating being placed between said colored-light source and said first inclined working face to modify said incident light beams, said television camera being positioned opposite said second inclined working face of said transparent prism to receive light beams reflected from said bottom planar surface of said transparent disk near said transducing head, whereby said apparatus provides elevated measurement accuracy, high calibration resolution, and the ability to measure flight elevation and to test dynamic behavior of an actual transducing head for purposes of production and quality control.

13. The apparatus of claim 12 wherein said transparent disk, said transparent lens, and said transparent prism are made of a material selected from the group consisting of glass, plastic, and crystalline materials.

14. The apparatus of claim 12 wherein said convex spherical top surface and said bottom planar surface of said transparent disk, said concave spherical bottom surface and said top planar surface of said transparent lens, and said first and second inclined working faces and said bottom face of said transparent prism have surface finishes of optical quality.

* * * * *

UNITED STATES PATENT AND TRADEMARK OFFICE
CERTIFICATE OF CORRECTION

PATENT NO. : 5,257,093
DATED : October 26, 1993
INVENTOR(S) : M. Mager, et. al.

It is certified that error appears in the above-indentified patent and that said Letters Patent is hereby corrected as shown below:

On the Title page, item [73], Assignee: "Guziktechnical" to --Guzik Technical--.

Signed and Sealed this

Fifth Day of April, 1994

*Attest:*

BRUCE LEHMAN

*Attesting Officer*     *Commissioner of Patents and Trademarks*